Oct. 13, 1936.   H. L. BLUM   2,057,227
DEVICE FOR EXTRACTING JUICE FROM FRUIT
Filed July 21, 1934
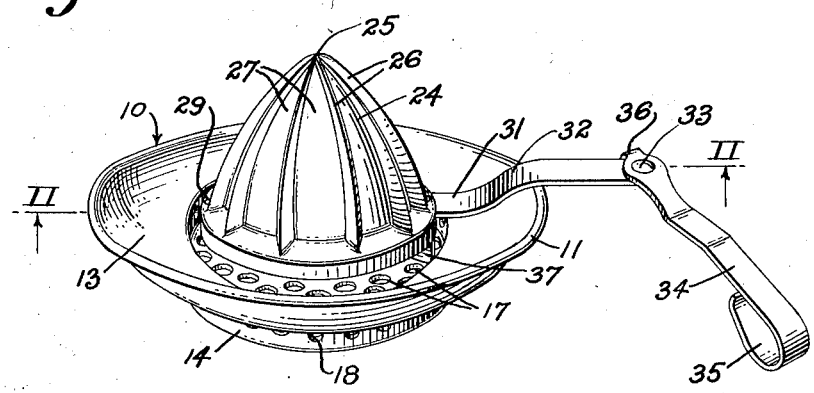
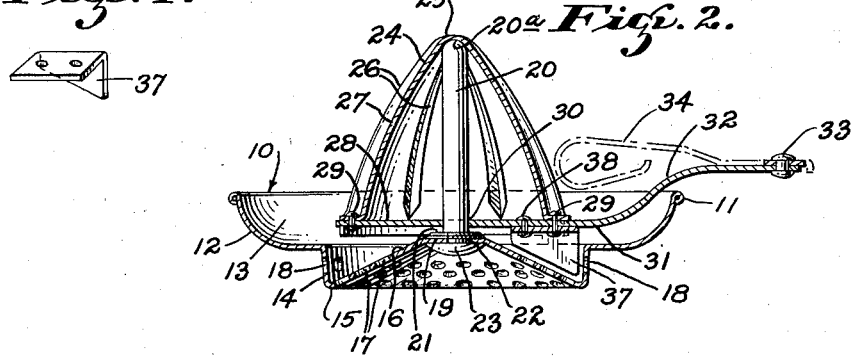
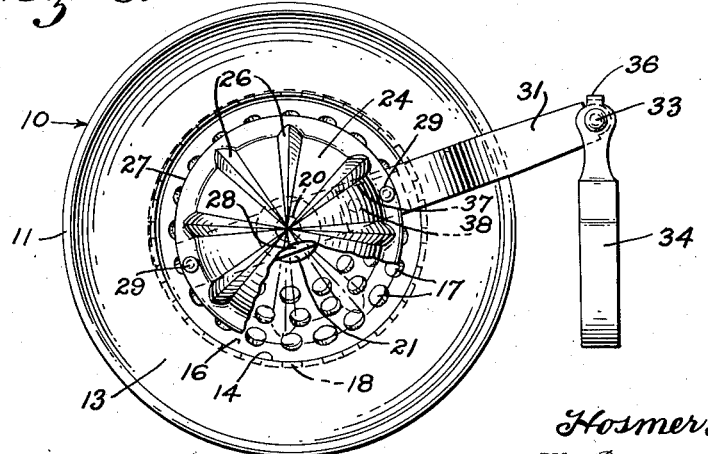
INVENTOR.
Hosmer L. Blum
BY
ATTORNEY Patented Oct. 13, 1936

2,057,227

UNITED STATES PATENT OFFICE 2,057,227

DEVICE FOR EXTRACTING JUICE FROM FRUIT

Hosmer L. Blum, Burlingame, Calif.

Application July 21, 1934, Serial No. 736,366

4 Claims. (Cl. 146—3)

This invention relates to devices for extracting juice from fruit such as oranges, lemons and the like and relates more particularly to devices of that character which may be conveniently used directly over a bowl, cup, or glass and in which the device may be manipulated by oscillatory movement of a lever or handle member which is offset or at one side of the device.

Among the objects of the invention are to provide a device for extracting juice from fruit which is operable by oscillatory movement from the side of the device; another object is to provide a device for extracting fruit juice in which the juice-extracting element is supported both at its apex and base; another object is to provide a novel strainer member adapted to fit over a cup or glass and having a flange to prevent lateral movement within the receptacle; another object is to provide a juice extracting device which is operable by oscillatory movement from the side thereof and in which a reamer for extracting juice is supported at its apex and base and finds its foundation support on a strainer member. A further object is to provide a novel type of handle member or lever for manipulation of the device. Other objects are to provide a plow or scraper for preventing pulp from the reamer from clogging the openings of the strainer and to generally improve upon devices of this character.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims, without departing from the spirit or sacrificing any of the advantages of the invention.

To more clearly comprehend the invention reference is directed to the accompanying drawing, wherein:—

Fig. 1 is a perspective of the invention.

Fig. 2 is a vertical section on line II—II of Fig. 1.

Fig. 3 is a plan view of the invention partly broken away to show structure.

Fig. 4 is a perspective view of a plow device employed in the apparatus.

Referring to the drawing wherein like characters of reference designate corresponding parts, 10 represents generally a strainer preferably having a rim 11 substantially circular in plan and a wall tapered downwardly and inwardly and arcuately in cross-section as at 12 providing a saucer portion 13, the saucer portion terminating in a downwardly extending flange 14 which, at its bottom 15 forms what may be termed a trough or well. From the trough or well 15 the central portion of the saucer is formed upwardly providing a truncated cone 16 which is provided with openings or perforations 17. If desired the perforations may also extend into the downward flange 14 as at 18. At the plane of the truncation 19 the upformed portion mounts a pin 20 which may be inset or grooved at its base to receive a washer 21 which spreads the downward thrust upon the pin over a large area of the up-formed portion. The pin may be mounted through the truncation of the upformed portion through a hole or opening 22 and may be fixedly secured therein by swaging the lower end thereof as at 23.

A reamer or burr 24 is provided, the exterior of which may be of any suitable and well-known type usually ellipsoid in vertical cross-section and having an apex 25 from which ridges 26 and valleys 27 extend downwardly. It is preferred that the reamer shall comprise a hollow shell as best shown in the cross-section of Fig. 2. Transversely of the base of the reamer is a cross-bar 28 which may be integral with the reamer or fixedly secured thereto in any suitable manner such as swaged rivets 29. The cross-bar is provided with an opening 30 through which the pin 20 may pass. A handle member 31 extends radially outwardly from the base of the reamer and is offset vertically as at 32 so as to pass over the rim 11 of the saucer and extend therebeyond. The handle 31 at its outer end is provided with a pivoted joint 33 which connects with a hand grip member 34 so as to pivot in a plane perpendicular to the axis of the reamer, the hand grip member having its outer end retroverted upon itself as at 35 so that said hand grip member may swing upon its pivot to the opposite side of the handle 31 in order that a left-handed person may operate the device with equal facility as a right-handed person. In the views herein the device is illustrated for operation by a right-hand person. The pivoted end of the hand grip member may be flanged downwardly as at 36 to form a lock against the edge of the handle 31. Means are provided to maintain the perforations 17 and 18 open for the flow therethrough of extracted juice and in this instance the said means comprises a plow or scraper 37 which extends downwardly from the bottom edge of the reamer and into close proximity to the bottom of the trough or well 15. The plow 37 may be affixed to the lower portion of the reamer in any suitable manner and, as exemplified herein, consists of an angle plate best shown in Fig. 4, the plate portion of which has holes whereby the plow may be riveted to the cross-bar 28 as at 38, the blade of the plow then depending into the trough.

It is believed that the foregoing description of the structure clearly illustrates the mode of operation thereof, the saucer 13 being placed over a receptacle with the depending flange fitting within the receptacle and preventing lateral movement of the device. The handle 31 is then oscillated back and forth by the pivoted hand grip 34 which rotatably oscillates the reamer 24 which has rotative bearing at the underside of its apex on the point 20ª of pin 20 and is supported against lateral movement at its base by the cross-bar 28, the extracted juice trickling down the valleys 27 and into the trough 15 from whence it drains into the receptacle. The opening 30 of the bar 28 has sliding fit on pin 20 so that the device can be readily separated for cleaning by merely lifting the reamer from the pin. The support of vertical thrust of the reamer adjacent its apex and against lateral thrust adjacent its base is particularly important in a device of this type which has the downward thrust due to pressing a half orange upon the point of the reamer and has lateral thrust due to the operation of the handle member in offset relation to the axis of the reamer and strainer. The pivoting of the hand grip member to the handle as at 33 permits a direct to-and-fro, straight line manipulation in substantially the plane of the rim of the strainer, instead of requiring the hand of the operator to accomodate itself to the arc through which the end of the handle member travels during oscillation thereof, and further facilitates the ease and convenience of operating the device.

Having thus described my invention what I claim and desire to secure by Letters Patent of the United States is:—

1. A device for extracting juice from fruit including a strainer, a pin fixedly mounted at its foot on the strainer and upstanding therefrom, a hollow reamer having an apex and open at its base and having a bar transversely of the base, said bar having an opening to receive said pin therethrough, said reamer being supported vertically on said pin at the underside of said apex and against lateral transverse movement by said bar at its base, said reamer being rotatably mounted relative to the strainer, and a handle member connected to the reamer adjacent the base of the reamer and extended radially outwardly therefrom, said strainer including a rim, a saucer portion extending downwardly and radially inwardly from the rim, and a downwardly flanged wall and an upformed central portion, the downwardly flanged wall and upformed central portion forming a trough, and the area within the diameter of the downwardly turned wall having openings through which juice may flow, and a plow member connected to and depending from the base of the reamer and extending into the trough of the strainer.

2. A device for extracting juice from fruit including a strainer, a pin fixedly mounted at its foot on the strainer and upstanding therefrom, a hollow reamer having an apex and open at its base and having a bar transversely of the base, said bar having an opening to receive said pin therethrough, said reamer being supported vertically on said pin at the underside of said apex and against lateral transverse movement by said bar at its base, said reamer being rotatably mounted relative to the strainer, and a handle member connected to the reamer adjacent the base of the reamer and extended radially outwardly therefrom beyond the periphery of the strainer, said strainer including a rim, a saucer portion extending downwardly and radially inwardly from the rim, and a downwardly flanged wall and a conical upformed central portion, the downwardly flanged wall and upformed central portion forming a trough, and the area within the diameter of the downwardly turned wall having openings through which juice from fruit may flow; and a plow member connected to and depending from the base of the reamer to move therewith, said plow member being adapted for agitating pulp in the trough of the strainer.

3. A device for extracting juice from fruit, including a strainer, a pin fixedly mounted at its foot on the strainer and upstanding therefrom, a hollow reamer having an apex and open at its base and having a bar transversely of the base, said bar having an opening to receive said pin therethrough, said reamer being supported vertically on said pin at the underside of said apex and against lateral transverse movement by said bar at its base, said reamer being rotatably mounted relative to the strainer, and a handle member connected to the reamer adjacent the base of the reamer and extended radially outwardly therefrom, said handle member having an extension hand-grip member pivotally connected thereto for relative pivotal movement, the axis of said pivotal movement being substantially parallel to the axis of the reamer.

4. A device for extracting juice from fruit including a strainer comprising a saucer having an outer annular plate which slopes downwardly and radially inwardly from its rim to the edge of a recess, said recess having a wall depending angularly downwardly from the inner edge of the annular plate and a perforated upwardly formed conical frustrum bottom wall in said recess, a pin fixedly mounted at its foot on top of the conical frustrum of the strainer and upstanding therefrom, a hollow reamer having an apex and open at its base, and having a bar transversely of the base, said bar having an opening to rotatably receive said pin therethrough, said reamer being supported vertically on said pin at the under side of said apex and against lateral movement by said bar at its base, said reamer being rotatably mounted relative to the strainer, and a handle member connected to the reamer at the base of the reamer and extended radially outwardly therefrom beyond the periphery of the strainer.

HOSMER L. BLUM.